United States Patent Office 3,794,542
Patented Feb. 26, 1974

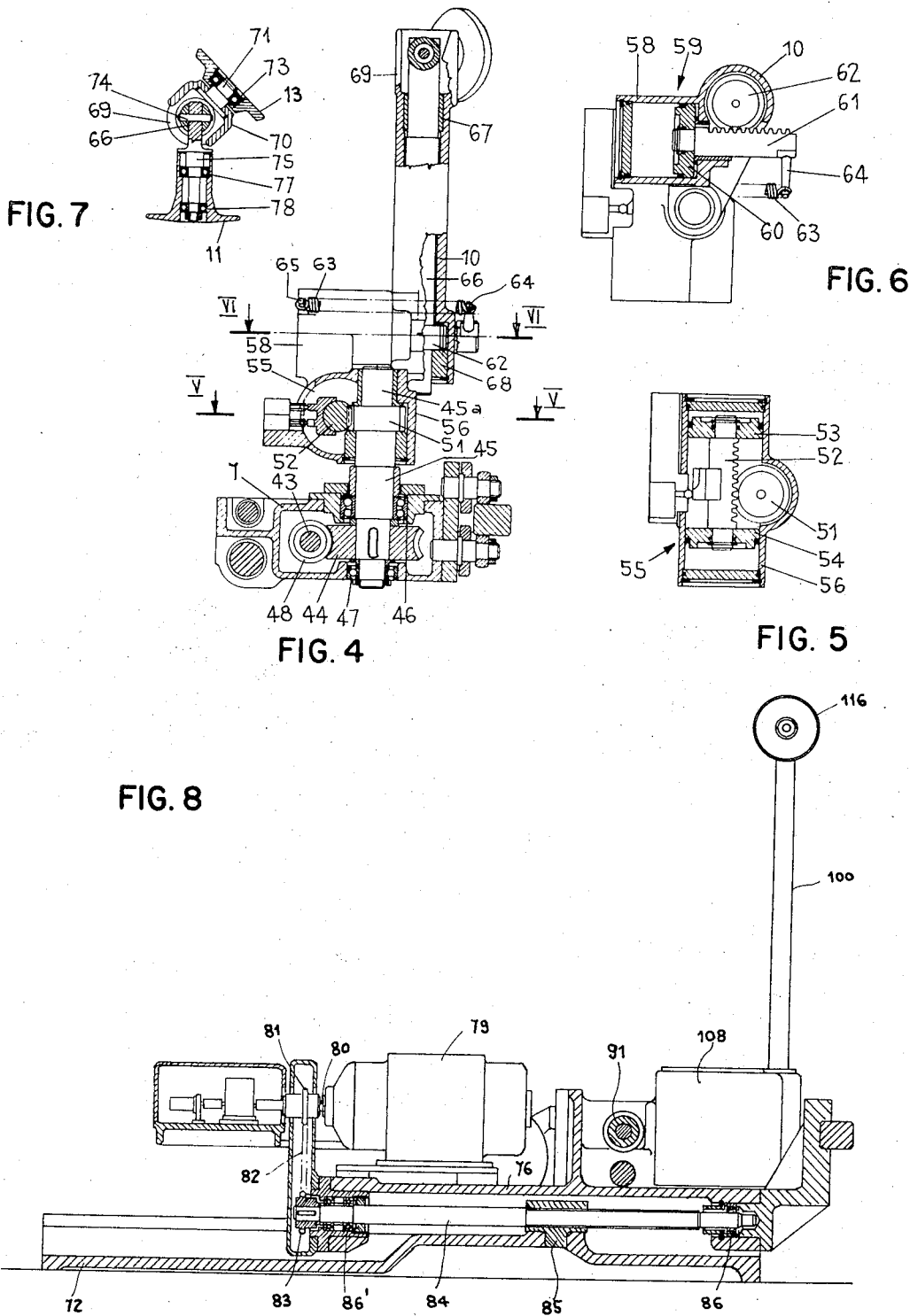

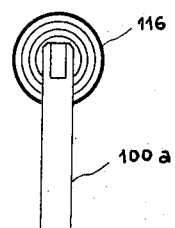
FIG. 9
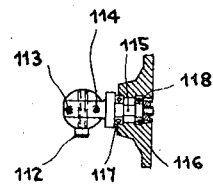
FIG. 12
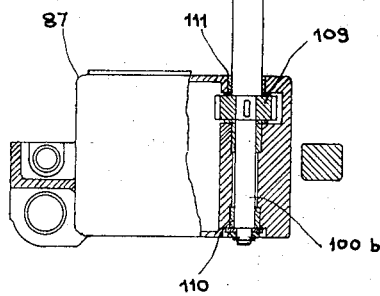
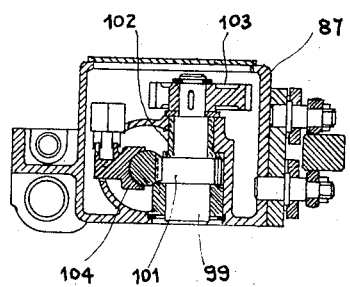
FIG. 11
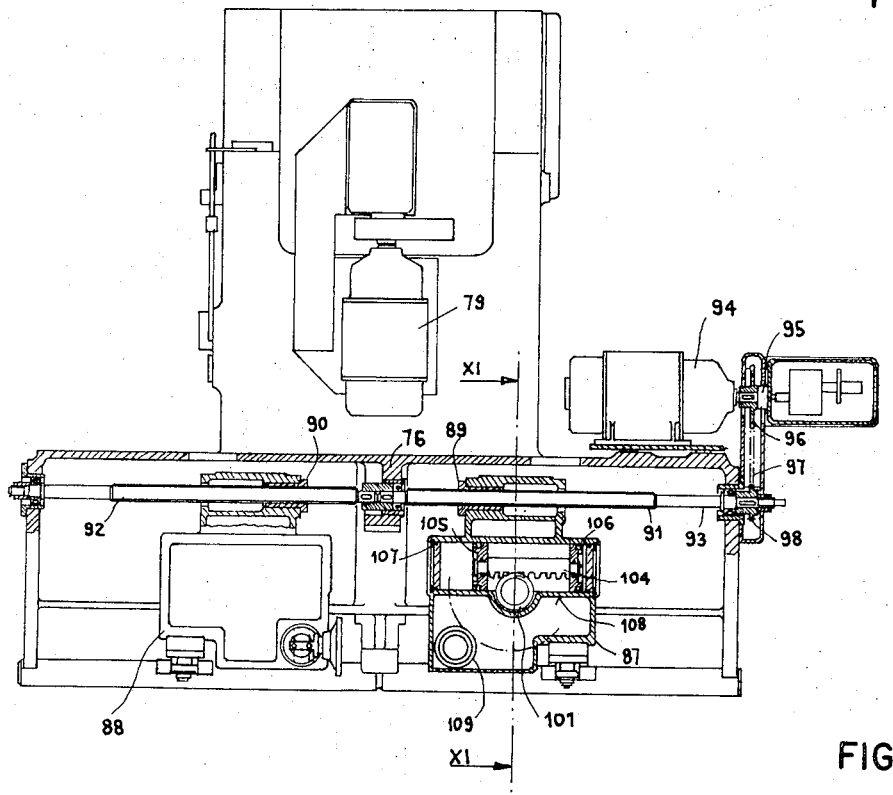
FIG. 10

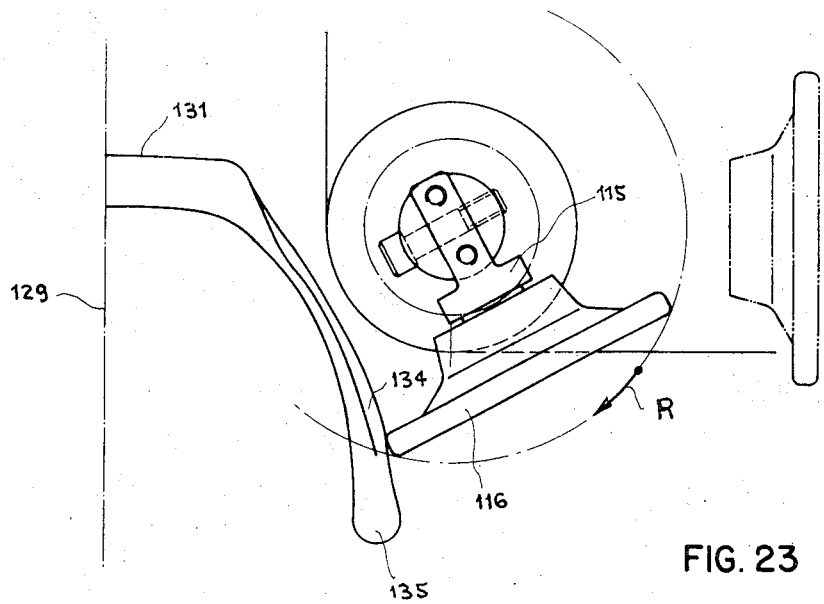
FIG. 23
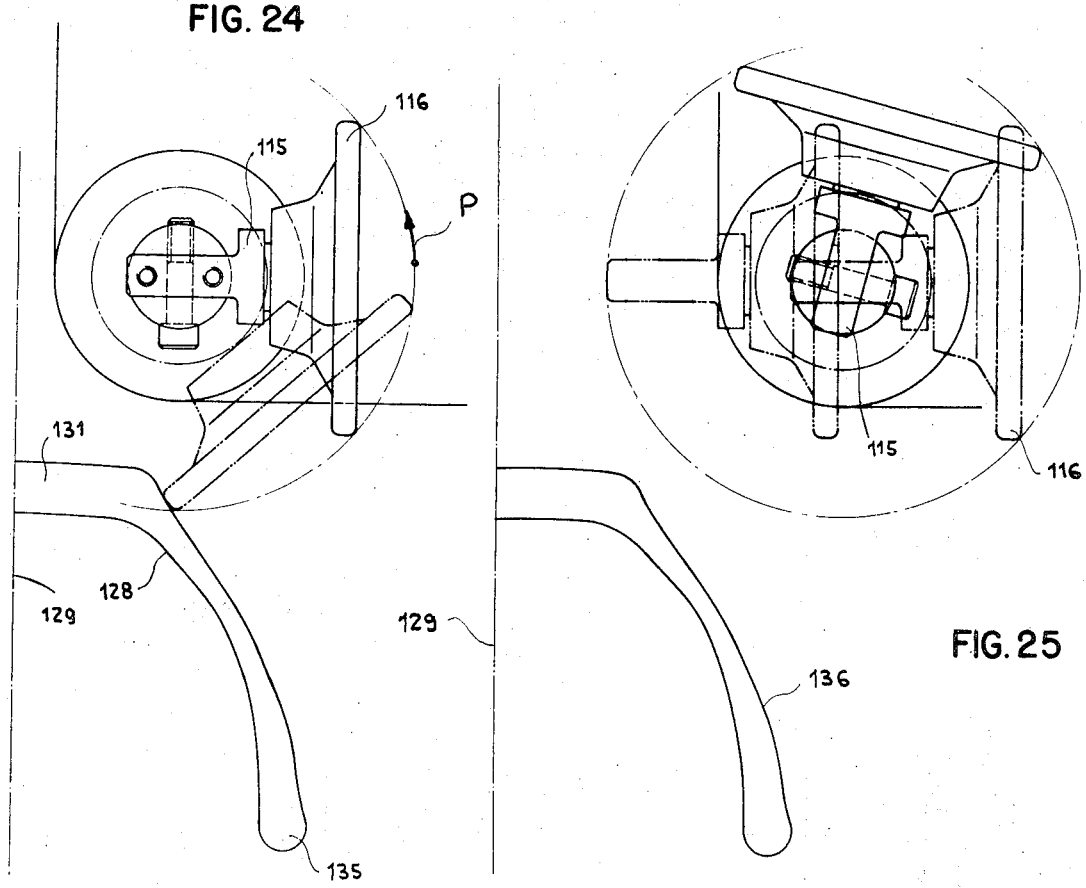
FIG. 24
FIG. 25

3,794,542
STITCHING APPARATUS FOR TIRE DRUM
BUILDING MACHINES
Bruno Colombani and Antonio Pacciarini, Milan, Italy,
assignors to Industrie Pirelli S.p.A., Milan, Italy
Filed Sept. 15, 1971, Ser. No. 180,819
Claims priority, application Italy, Sept. 18, 1970,
29,899/70
Int. Cl. B29h *17/08, 17/18*
U.S. Cl. 156—358                                                      4 Claims

ABSTRACT OF THE DISCLOSURE

The invention comprises stitching apparatus for tire building machines provided with a building drum which apparatus comprises a horizontal base; two carriages which can be moved along said base in a direction parallel to the longitudinal axis of the building drum by a first actuator means having reversible working sense and in the direction perpendicular to said axis by a second actuator means having reversible direction; two vertical columns each of which is integral at one end with one of said carriages and is connected at the other end to at least one stitching disc, the axis of rotation of the stitching disc lying in a plane containing the axis of rotation of the building drum; means for driving the axis of rotation of each stitching disc toward one of two angularly spaced extreme positions; and elastic means for elastically rotating in said plane the axis of rotation of each stitching disc; said apparatus additionally comprising means for changing the speed and direction of movement of said carriages, including an embodiment wherein their movements are mutually dependent; and embodiments wherein the extreme positions of the axis of rotation of each stitching disc are spaced apart at angles greater than about 180° and smaller than about 360°; embodiments wherein the elastic means are able to selectively rotate the axis of rotation of each stitching disc; and embodiments including programmer control means for controlling the actuators and elastic means so that their operations take place in a pre-established sequence.

---

The present invention concerns an apparatus for stitching tires manufactured on machines provided with a building drum.

As is known, the manufacture of pneumatic tires is, in general, carried out by applying a series of semi-finished products such as rubberized plies of cord fabric, rubber sheets, ring-shaped reinforcing structures, reinforcing bead wires, and tread band, in a pre-established arrangement on a cylindrical rotating drum. The so-called "shaping" of the tire, by means of which the latter is given a toroidal form, can be effected on the same machine used for producing the uncured tire, or on a second independent machine.

However, it is typically necessary to stitch the plies and the other semi-finished products constituting the uncured article in order to join them together as well as possible. Therefore, these components are pressed against the building drum by means of movable stitching discs in such a way as to expel any air which may remain trapped between two components of the uncured tire during processing thereof.

For this purpose, stitching apparatus of various types are used. For example, for stitching the uncured tire still in cylindrical form, a first pair of discs, which move along one generatrix of the building drum, and of a second pair of discs, which follow the profile of the drum shoulders are used. This operation of the stitching discs is obtained by providing a kinematic assembly, comprising electric motors and pneumatic or hydraulic cylinders, together with various lever systems, which complicate the construction of the stitching apparatus, making it expensive.

Another known stitching apparatus uses an individual disc on each of two carriages slidable on a horizontal bench. The discs lie in a plane perpendicular to the axis of the building drum and are moved along the surface and shoulders of the building drum by an articulated quadrilateral controlled by a coupling consisting of a worm gear pair and a single-acting cylinder having a horizontal axis. However, this stitching apparatus can be used only in building machines on which only the first step in the manufacture of the uncured tire is carried out, i.e., only where the tire still has a cylindrical form.

The object of the present invention is to provide a sttching apparatus having stitching discs which can be moved along the surface of the uncured tire, whatever the shape of latter with respect to the type of the building drum adopted for the machine, said discs remaining perfectly pressed on said surface both when they move from the midline of the building drum towards the drum shoulders and when they move in the opposite direction. Moreover, according to the present invention, the discs can turn up the ply skirtings about the bead wires and can carry out adhesion of the ring-shaped reinforcing structures and the tread band to the carcass.

Accordingly, the object of the present invention is a stitching apparatus for tire building machines provided with a building drum, which comprises:

a horizontal base;
two carriages which can be moved along said base in a
    direction parallel to the longitudinal axis of the building
    drum by a first actuator having a reversible working
    sense, and in a direction perpendicular to said axis by
    a second actuator having a reversible working sense;
two vertical columns, each of which is integral, at one
    of its ends, with one of said carriages, and houses at
    the other end at least a stitching disc, the axis of rotation of the discs lying on a plane containing the axis
    of rotation of said building drum;
means for driving the axis of rotation of each stitching
    disc toward one of two angularly spaced extreme
    positions;
elastic means for elastically rotating on said plane the
    axis of rotation of each stitching disc;
said stitching apparatus being characterized in that:
the movements of the carriages and the speed of said
    movements are mutually dependent as regards magnitude, direction and sense;
the extreme positions of the axis of rotation of each
    stitching disc are spaced apart from each other at an
    angle greater than 180° and smaller than 360°;
the elastic means are able to selectively rotate the axis
    of rotation of each stitching disc in the direction of
    either of said extreme positions;
the actuators and the elastic means are controlled by a
    conventional programmer, for instance of the numerical
    control type, so that their operation may take place
    according to a pre-established sequence.

The reversible working sense actuators may advantageously be motor-speed reducers. Similarly, the elastic means may comprise, for each carriage, in one embodiment of the invention, a unique double-acting cylinder, whose piston actuates the vertical column and the stitching disc positioned at the free end thereof or, in another embodiment of the invention, may also comprise a single-acting cylinder and further a third motor-speed reducer for both carriages.

In the first case each double-acting cylinder has an adjustable stroke, which is sufficiently long to provide the stitching disc anywhere between two extreme positions, spaced apart from each other at an angle preferably ranging between 270° and 360°.

In the second case this arrangement is partially carried out by the third motor-speed reducer, while the single-acting cylinder actuates a vertical shaft coaxial to the column, the other end of which carries a second stitching disc, mounted in cantilever fashion.

The objects of the present invention will be better explained by the following description, which relates to at least two possible alternative embodiments and is made with reference to the accompanying drawings thereof wherein:

FIGS. 2–7 represent a first embodiment; more precisely:

FIG. 2 is a lateral view partially sectioned along a plane perpendicular to the axis of the building drum;

FIG. 3 is a plan view, also partially sectioned;

FIG. 4 illustrates one half of the stitching apparatus partially sectioned along a plane perpendicular to the axis of the tire building drum;

FIGS. 5 and 6 are two sections of some parts of the stitching apparatus, taken along planes V—V and VI—VI, respectively, of FIG. 4;

FIG. 7 illustrates the stitching discs mounted on one half of the stitching apparatus along a horizontal section plane;

FIGS. 8–12 represent a second embodiment of the invention; more precisely:

FIG. 8 is a lateral view, partially sectioned by a plane perpendicular to the axis of the building drum;

FIG. 9 illustrates one half of the stitching apparatus partially sectioned along a plane perpendicular to the axis of the tire building drum;

FIG. 10 is a plan view, also partially sectioned;

FIG. 11 illustrates some details of construction of one half of the stitching apparatus, sectioned along plane XI—XI of FIG. 10;

FIG. 12 illustrates the stitching disc mounted on one half of the stitching apparatus along a horizontal section plane;

FIGS. 19–25 represent other working steps of the stitching apparatus in the second illustrated embodiment.

Figure 1:
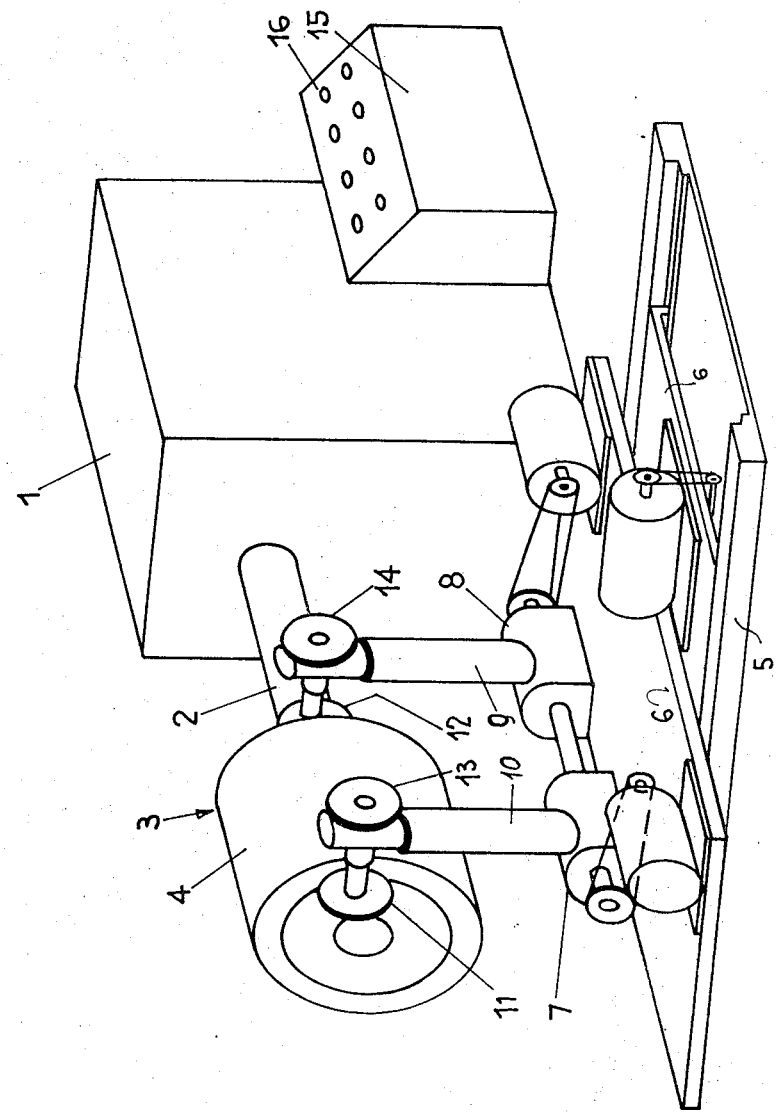
FIG. 1 is a partially schematic, isometric view of a simplified form of the stitching apparatus.

FIG. 1 shows diagrammatically a tire building machine which comprises a structure 1 which, through the horizontal hollow mandrel 2, supports a building drum 3 which carries a carcass 4 (or a part of it, for example the first ply) intended to be stitched. The stitching operation is carried out by a stitching apparatus which comprises a horizontal base 5 on which a frame 6, supporting two carriages 7 and 8, slides in a direction perpendicular to the drum axis. Carriages 7 and 8 support the vertical columns 10 and 9, respectively, which respectively house on their free ends horizontal axis stems, each carrying a stitching disc, 11 and 13, and 12 and 14, respectively. All the movements of the stitching apparatus (and in this case also those of the tire building machine with which it is associated) are controlled by a numerical control programmer contained in the box 15 provided with a luminous warning panel board 16.

The details of the stitching apparatus, in a first embodiment of the invention, appear in FIGS. 2–7. Frame 6 slides on base 5, and is sustained by guides (not represented in the figures), since it is moved by a threaded shaft 17.

Shaft 17 meshes with a lead nut 18, and is supported in frame 6 by bearings 19 and 20.

The motor-speed reducer 22 is mounted at the centerline of frame 6; the sprocket wheel 24 is keyed on the output shaft 25 emerging from the motor-speed reducer. The sprocket wheel 24 imparts motion, through a chain 23, to the sprocket wheel 21 keyed at one end of shaft 17.

In the present specification the expression "motor-speed reducer" means a device comprising a reversing motor, preferably a D.C. electric motor, coupled with a gear box capable of supplying three pairs of equal speeds having opposite senses with respect to one another (a pair of high speeds for the positioning operation, a pair of intermediate speeds for the normal operation rate, and a pair of low speed for the reduced operation rate).

It is understood that these operations may be carried out with equivalent means, known to anyone skilled in the art. In this way, when the motor-speed reducer 22 is actuated, frame 6, together with carriages 7 and 8, are moved in a direction perpendicular to the axis of the building drum.

Carriages 7 and 8, which are located in a symmetrical position with respect to the centerline of frame 6, are integral with lead nuts 26 and 27, respectively, which mesh with two portions 28 and 29 of a horizontal shaft 30, which is supported by bearings 31 and 32, said portions being provided with equal threads having two opposite screw senses.

Frame 6, at one end of shaft 30, carries the motor-speed reducer 34, on whose output shaft 37 is keyed, sprocket wheel 36 which, by means of chain 35, actuates sprocket wheel 33, keyed on the corresponding end of shaft 30.

It can be therefore understood that, by actuating the motor-speed reducer 34, carriages 7 and 8 move on frame 6 in the two opposite directions parallel to the axis of the building drum. The carriages move with the aid of appropriate guides.

On frame 6, in a position opposite that of the motor-speed reducer 34 with respect to its centerline, there is mounted a third motor-speed reducer 38, on whose output shaft 39 is keyed the sprocket wheel 40. Said sprocket wheel, by means of chain 41, actuates the sprocket wheel 42 which is keyed to the end of the grooved shaft 43, parallel to shaft 30, and housed on the opposite end of the shaft from the sprocket wheel 33 on shaft 30. The grooved shaft 43 is supported in frame 6 by bearings 49 and 50 and it imparts rotation to the worm screw 48, which is also grooved, allowing the worm screw to itself move along the shaft 43.

Since the portion of the apparatus concerning carriages 7 and 8 is symmetrical, only one of them will be described herebelow, with particular reference to FIGS. 4–7.

Figure 2:
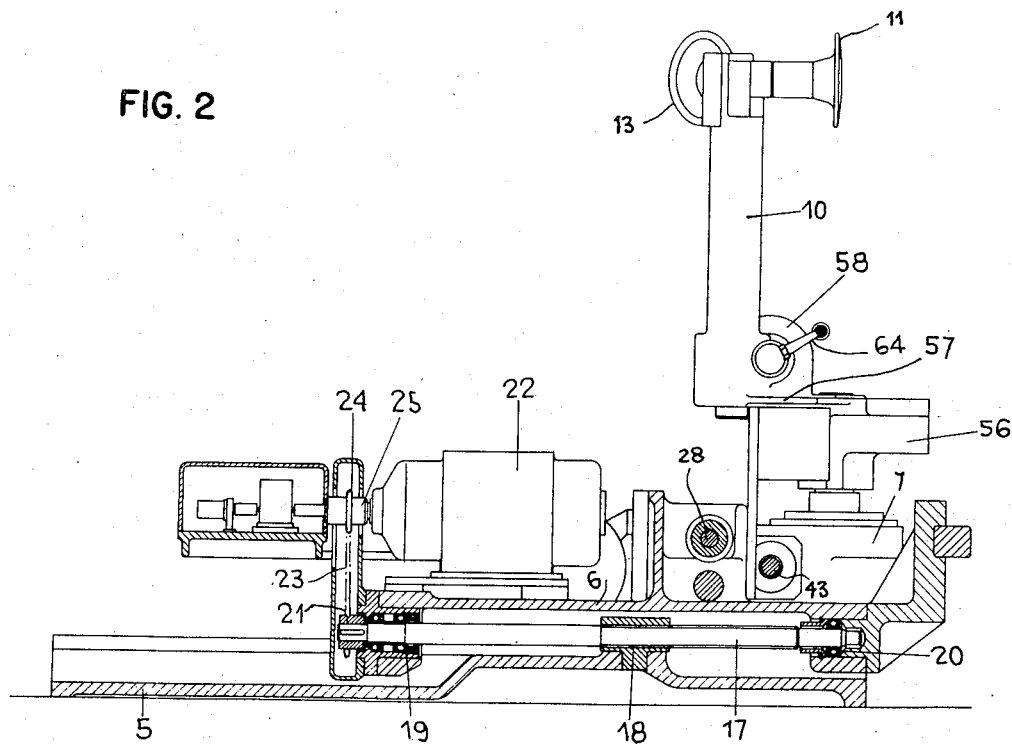

In order to more clearly show the details of construction, in FIG. 4, column 10 is represented while it is in a position rotated with respect to that of FIG. 2.

Inside carriage 7 there is gear 44 which is keyed on the vertical shaft 45 which is housed in carriage 7 through bearings 46 and 47.

The upper portion 45a of shaft 45 protrudes from carriage 7 and is enclosed within a box 56, which is idle with respect to shaft 45. Inside box 56 there is gear 51, which is integral with portion 45a of shaft 45, and meshes with a rack 52 constituting the stem for connecting the two pistons 53 and 54 of a double-acting cylinder 55, which has a horizontal axis, and whose walls are a part of box 56. Box 56 remains locked with respect to shaft 45 when the double-acting cylinder 55 is stopped in a fixed position by fluid under pressure, because rack 52 is linked to gear 51, which is fixed to portion 45a of shaft 45.

As can be seen from FIG. 2, the upper portion 57 of box 56 extends laterally to constitute the base of a second box 58 which is rigidly joined to the base of vertical column 10. The walls of box 58 comprise those of the single-acting cylinder 59, also having a horizontal axis, and further include a piston 60 and stem 61, which is contained inside box 58 and is in the form of a rack engaging with gear 62, which is coaxial with the axis of column 10.

The return stroke of piston 60 is carried out by means of helical spring 63, which is connected by peg 64 to rack 61 and by hook 65 to the outside of box 58.

Gear 62 is keyed on the lower end of the vertical shaft 66 encased in column 10 with the interposition of bushings 67 and 68. The upper portion of column 10 comprises an enlargement 69, having three flattened faces, on which is secured, in a known way, a collar 70 containing a housing for a stem 71, having a horizontal axis, on which is mounted a first stitching disc 13 with interpositioned roller bearing 73.

At enlargement 69, the vertical shaft 66 supports, by means of a pin 74, a stem 75 having a horizontal axis, on which is mounted a second stitching disc 11 with interpositioned roller bearings 77 and 78. The stem 75 is mounted in cantilever fashion on the flattened part of enlargement 69 through a slot (not illustrated).

In view of the above description it can be understood that, by actuating the motor-speed reducer 38, the worm screw 48 and therefore the worm gear 44 begin to rotate. The latter actuates rotation of the shaft 45 and consequently also movement of the boxes 56 and 58, together with the elements respectively encased therein, the vertical column 10 and the vertical shaft 66.

Therefore the actuation of the motor-speed reducer 38 induces the parts of the stitching apparatus mounted on each of the two carriages 7 and 8 to approach and to detach from, the surface of the uncured tire to be stitched; said parts are moved along trajectories which are arcs of circles lying on the horizontal plane containing the axis of stems 71 and 75 and which have, as center of curvature, the point of intersection of the axis of shaft 45 with said horizontal plane. In addition to the aforementioned actuation, it is often desirable to "finely" adjust the stitching discs on the surface to be stitched, in order to carry out the stitching within very narrow preferred limits of dimension and shape.

Moreover, it is advantageous to secure the stitching discs to the frame by means of an elastic, and not rigid, connection, and to have for each of the carriages 7 and 8 two stitching discs different from each other in size and geometrical shape, so that one or the other pair of discs may be selectively used, for example according to whether the carcass plies are to be stitched onto one another or their skirtings are to be turned up about the bead cores, or whether the whole carcass is to be removed from the drum at the end of the first tire building operation.

The elastic means which have the freedom to perfectly provide these advantages are, for each of carriages 7 and 8, a double-acting cylinder 55 and a single-acting cylinder 59.

By actuating the double-acting cylinder 55 (in which, for simplicity, the feeding and discharge ducts for the working fluid are not illustrated) rack 52 rotates gear 51. Since shaft 45 cannot rotate, because it is prevented from doing so by the helical coupling between gear 44 and worm screw 48, box 56 rotates about the axis of the vertical shaft 45, on which it is idly mounted, actuating with it, by virtue of the above indicated apparatus, both of the stitching discs 11 and 13.

Therefore the double-acting cylinder 55 has the task of rotating the axes of rotation of the two stitching discs integrally with respect to each other, selectively, in both senses, with respect to the position already reached by virtue of the actuation imparted by the motor-speed reducer 38.

On the contrary, by actuating the single-acting cylinder 59, it can be seen that rack 61 through gear 62 makes the vertical shaft 66 rotate about its own axis, independently of column 10, by virtue of the presence of bushings 67 and 68. Therefore, stem 75 of stitching disc 11 rotates integrally with shaft 66 along the horizontal slot obtained on the enlargement 69 of column 10. In this way, disc 11 can be actuated while disc 13 is detached from the uncured tire, or vice versa.

A second embodiment of the invention which is characterized by a greater simplicity of construction will now be described.

As shown in FIGS. 8 and 10, the stitching apparatus comprises a horizontal base 72 on which a frame 76, resting on guides not illustrated in the figures, slides in a direction perpendicular to the axis of the building drum. The motor-speed reducer 79, on whose output shaft 80 is keyed a sprocket wheel 81, is mounted on frame 76, at the centerline of the latter.

Sprocket wheel 81 imparts motion, through chain 82, to a sprocket wheel 83 which is arranged at one end of a threaded shaft 84, which meshes with a lead nut 85 and is supported, through bearings 86 and 86', by the same frame 76.

Therefore, when the motor-speed reducer is actuated, frame 76 moves in a direction perpendicular to the drum axis, with the aid of appropriate guides.

Frame 76 carries the carriages 87 and 88, arranged symmetrically with respect to its centerline, and which are respectively integral with lead nuts 89 and 90 meshing with the two portions 91 and 92 of horizontal threaded shaft 93 which is parallel to the axis of the tire building drum, said portions being provided with equal threads, having opposite screw senses. Frame 76 also carries the motor-speed reducer 94, on whose output shaft 95 is keyed sprocket wheel 96 which, by means of a chain 97, actuates sprocket wheel 98 keyed on shaft 93. Therefore, when said motor-speed reducer 94 is actuated, it causes carriages 87 and 88 to move on frame 76, in opposite directions parallel to the axis of the building drum.

Since the portion of apparatus concerning carriages 87 and 88 is symmetrical, only one carriage will be described with reference to FIGS. 9–12. Carriage 87 encases a first vertical shaft 99 and the lower part 100b of a second vertical shaft 100. A gear 101 and a sector gear 103, arranged above it and spaced therefrom by a bushing 102, are keyed on shaft 99.

Gear 101 meshes with a rack 104 comprising the stem for the connection of the two pistons 105 and 106 of double-acting cylinder 107, which has a horizontal axis, and whose walls are a part of a box 108 which is also encased by carriage 87. Sector gear 103 meshes with a gear 109 keyed on shaft 100, which is supported by carriage 87 through bushings 110 and 111.

Stem 115, which has a horizontal axis and on which is mounted a stitching disc 116 with interpositioned bearings 117 and 118, is fixed on the upper part 100a of shaft 100 by means of screws 112, 113 and 114 (see FIG. 12). Therefore, it can be seen that from a functional standpoint the two above described embodiments of the stitching apparatuses are substantially equivalent.

An adequate selection of the stroke of pistons 105 and 106 of cylinder 107, obtained with conventional means not illustrated, and of gears 101, 103, 109, enables the axis of rotation of the stitching disc 116 to rotate throughout angular trajectories (of scope smaller than 360°) on the horizontal plane containing said axis, and moreover to effect the "fine" adjustments which are desirable in carrying out the stitching of the uncured tire within narrow limits of dimension and shape. Such "fine" adjustments are obtainable thanks to the fact that the double-acting cylinder 107 is an elastic, and not rigid, element, so that disc 116 can perfectly adhere to the surface to be stitched, whatever is the shape of the latter, either cylindrical or toroidal.

As already said, in order to show the versatile applications of the present invention, the operation of the stitching apparatus is described by making reference to two desirable service conditions, namely one of each of the two above described embodiments, it being understood that both embodiments are able to satisfy these two service conditions.

The first desirable service condition (illustrated in FIGS. 13–18) concerns the operations for stitching an uncured tire (initially built up on a machine provided with a rigid drum) which are effected according to the first embodiment of the present invention. For the above indicated conditions of construction symmetry, these figures relate, for simplicity's sake, only to the operations made by the stitching discs 11 and 13, mounted on carriage 7.

Figure 3:
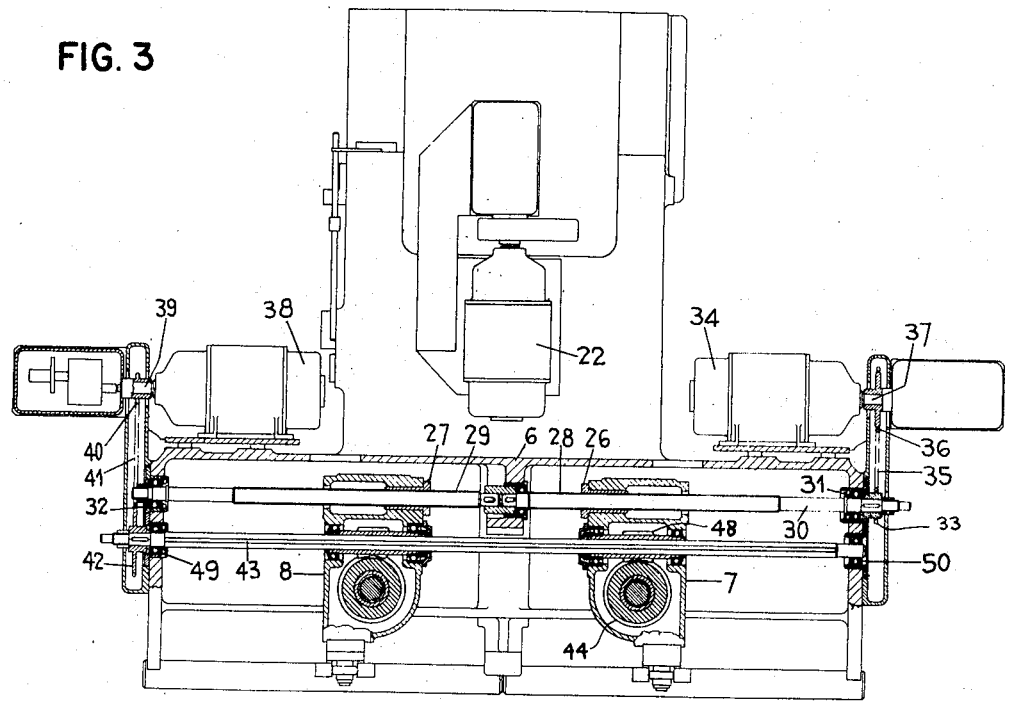
Figure 13:
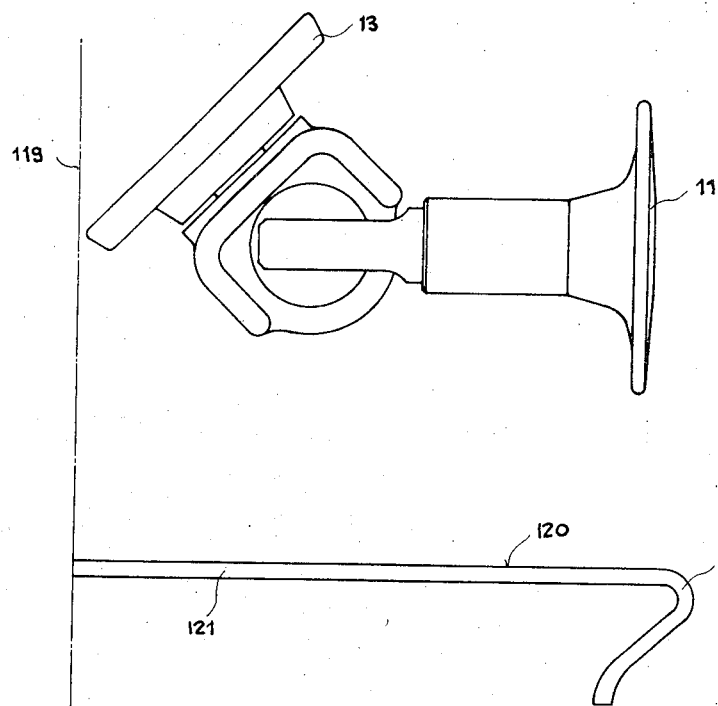
FIGS. 13–18 illustrate some working steps of the stitching apparatus in the first illustrated embodiment.
Figure 14:
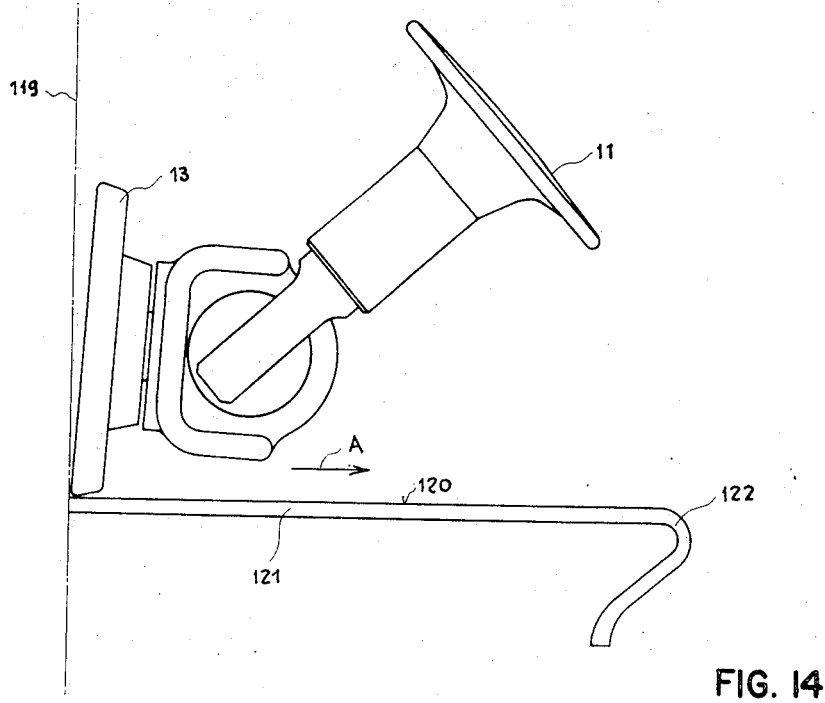

The first step is that of stitching the first carcass ply 120 on the building drum 121. At the beginning of this operation, i.e., in rest position, discs 11 and 13 are directed to the opposite part with respect to the drum, while carriage 7 (for example as represented in FIG. 3) is outside the overall diameter of the drum between the midcircumferential plane 119 of the tire, which is also the centerline of the building drum, and the shoulder 122 of the drum 121 (FIG. 13). While the latter is put into rotation about its own axis, carriage 7, with discs 11 and 13, is caused to approach drum 121, by means of the action of motor-speed reducers 22 and 34. When carriage 7 is at an appropriate distance from carcass ply 120, the motor-speed reducers 22 and 34 are stopped, while the double-acting cylinder 55 works until disc 13 is pressed on carcass ply 120 in such a way that the front plane of disc 13 is approximately perpendicular to ply 120. The stitching of the cylindrical portion of ply 120 is effected by moving disc 13, fastened to carriage 7, in a direction parallel to the axis of drum 121 (which is kept in rotation) through operation of the motor-speed reducer 34. Therefore, disc 13 moves away from the mid-circumferential plane 119 in the direction of arrow A (FIG. 14).

Figure 15:
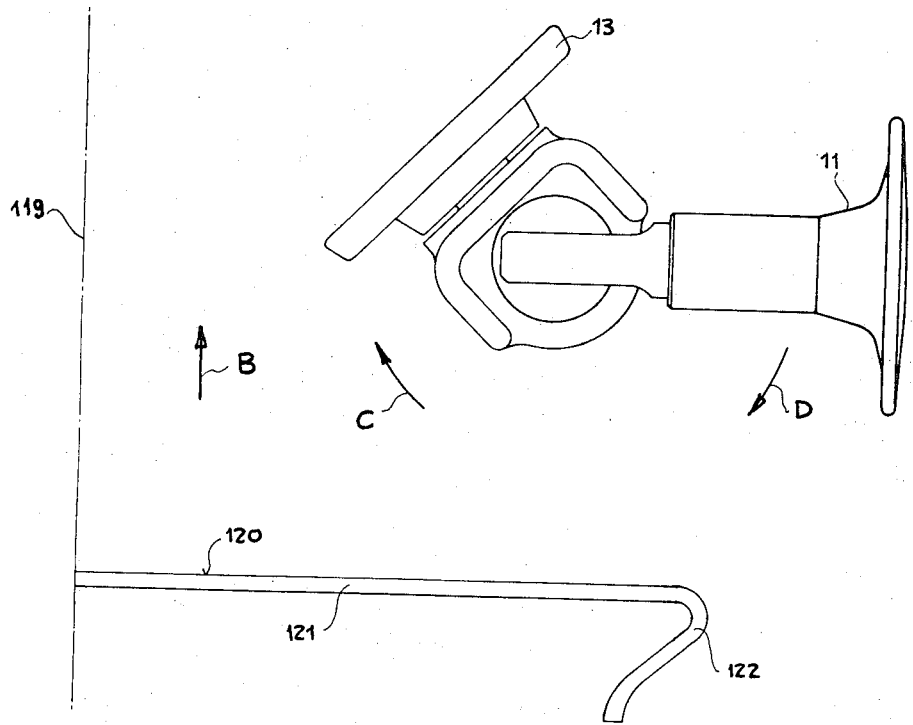

When, as described above, disc 13 has completed the stitching of the cylindrical portion of carcass ply 120, the motor-speed reducer 34 is stopped and the double-acting cylinder 55, reversing its working direction, detaches disc 13 from the just stitched surface. Then the motor-speed reducer 22, which detaches carriage 8 in the direction of arrow B, and the motor-speed reducer 38, which rotates the discs in the direction of arrow C, are actuated (FIG. 15).

Finally, the single-acting cylinder 59 is actuated, and makes the axis of disc 11 rotate in the direction of arrow D, with respect to disc 13 (which remains fixed), pressing it against the portion of carcass ply 120 which is disposed at shoulder 122.

The primary condition which must be respected when stitching tire portions having a non-constant curvature is that the front plane of the operating disc must remain perpendicular to the surface of the tire at every point. Therefore, in this case, the axis of disc 11 must at every point be maintained at 90° with respect to the perpendicular to the part of carcass ply 120 disposed at shoulder 122. The stitching of the part of said carcass ply which is disposed at shoulder 122 is effected by actuating the motor-speed reducers 22, 34, and 38 and the single-acting cylinder 59 in a programmed sequence. The programmer of the numerical control type for this stitching apparatus has as its main function accomplishing these operations in a synchronous way with one another during this stitching step, the above indicated condition of perpendicularly for the disc having to be exactly complied with in the variable curvature zones of the drum shoulder. Moreover, in this way the operation can be carried out in the best manner, irrespective of the environmental conditions and of the labor employed. Such numerical control programming can be advantageously carried out in accordance with U.S. application No. 42,691 filed on June 19, 1970, now U.S. Pat. No. 3,686,632.

Figure 16:
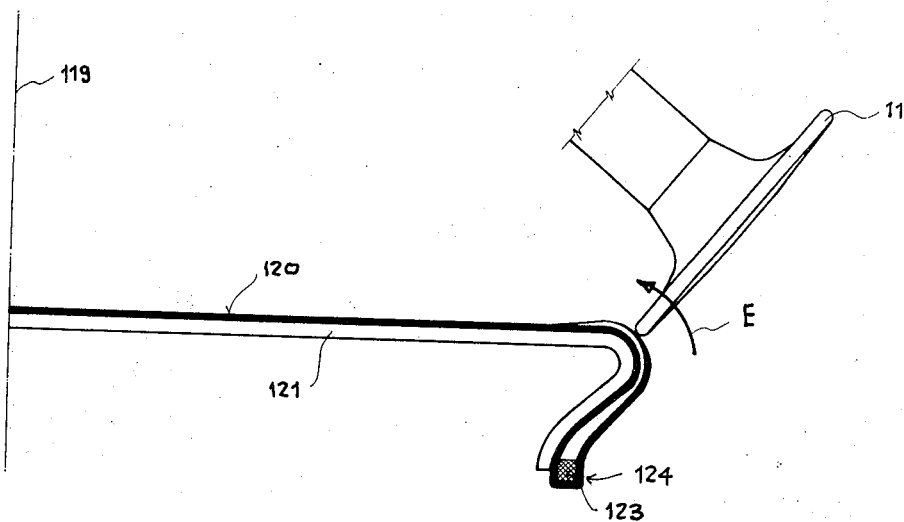
Figure 17:
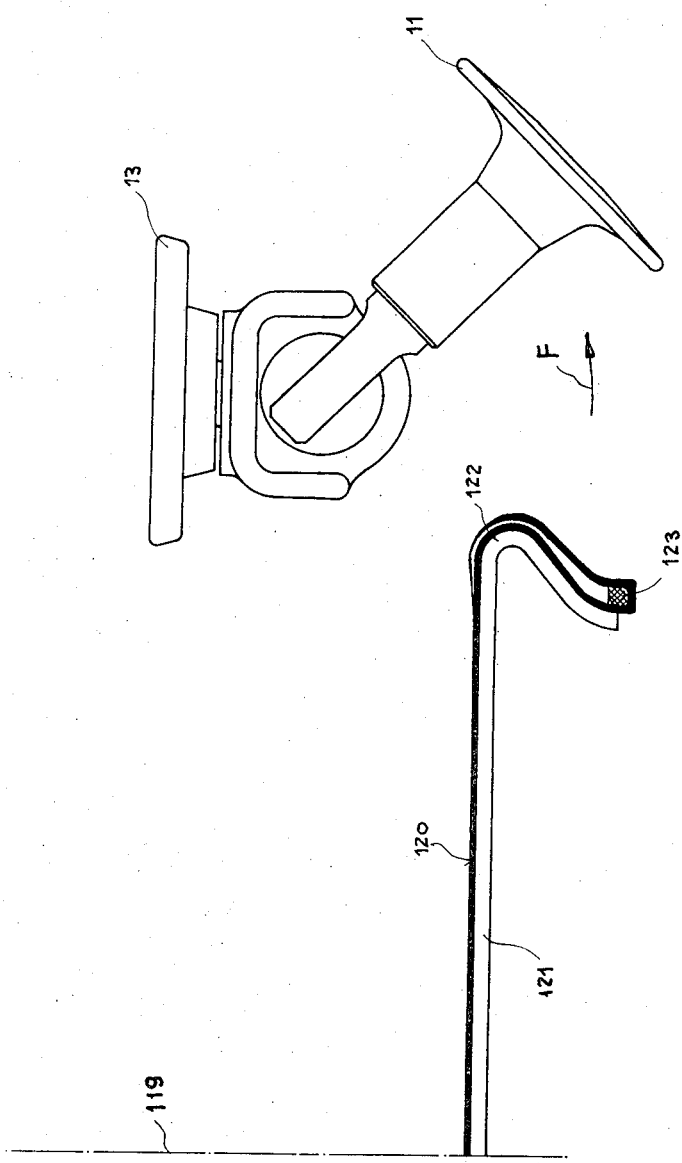

If a bead core 123 is applied to carcass ply 120 in a known way, the present stitching apparatus is also able to stitch the ply skirting which has been turned up about said bead core. In that case the stitching operation is made by starting from the portion 124 nearest the drum axis, namely in the direction of arrow E (FIG. 16). The stitching is carried out by actuating the motor-speed reducers 22, 34, and 38, here again according to a programmed sequence (as where the ply portion was disposed at the shoulder, but in the opposite direction) and by maintaining disc 11 in contact with the surface to be stitched, by means of the single-acting cylinder 59. After this step, the axis of disc 11 is detached at first by means of the helical return spring 63 of the single-acting cylinder 59 in the direction of arrow F (FIG. 17) and then by means of the motor-speed reducers 22, 34, and 38 in a way analogous to that described above.

Moreover, by means of the present stitching apparatus it is possible with the aid of the thin profile of disc 11 to remove the carcass at the bead from drum 121 at the end of the first building step.

Figure 18:
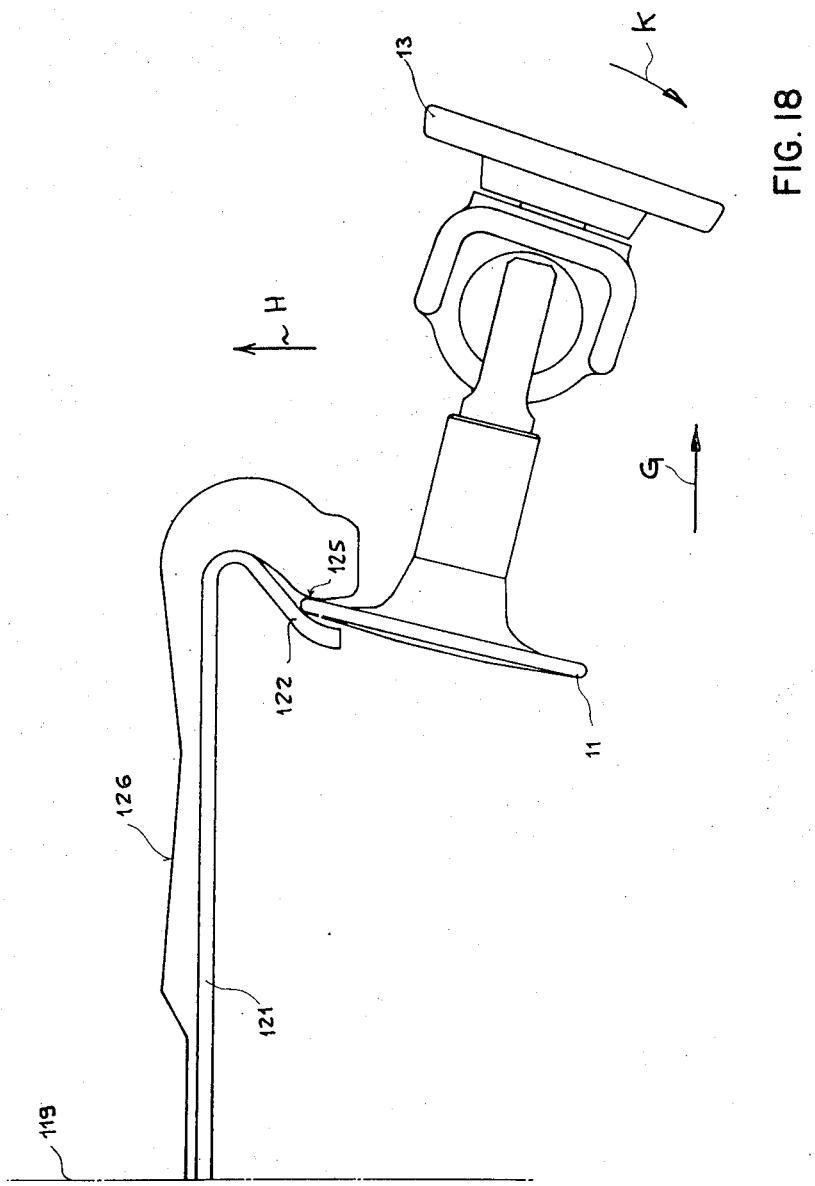

By means of the motor-speed reducers 22 and 34, carriage 7 is brought in the position nearest to the axis of the drum and axially external to the shoulders of the latter. Moreover, by operating the motor-speed reducer 38 and the single-acting cylinder 59, dis 14 is inserted between shoulder 122 and the inner side of bead 125. Then by operating simultaneously (depending on the numerical control programmer), the motor-speed reducers 34, 22 and 38 in such a way as to displace carriage 8 in the direction of arrow G, of arrow H, and of arrow K, respectively, an expedient and normal removal of carcass 126 from the drum itself is obtained as a consequence of the rotation of drum 121 about its own axis (FIG. 18).

The second desirable condition of employment of the stitching apparatus (as shown in FIGS. 19–25) concerns the stitching operations carried out, by way of example, according to the second embodiment of the invention, on an uncured tire which (after having been partially built up on a building machine having a rigid drum) is placed on an expandable drum in order to be shaped in a toroidal form, to receive an inexpansible reinforcing ring (breaker), and to receive the tread band. Again in this case, for the above indicated reasons of construction symmetry, FIGS. 19–25 illustrate the operations carried out by the individual disc mounted on carriage 87.

In this case, the first operation to be carried out is stitching the breaker 127 which is placed on carcass 128 in the zone over its mid-circumferential plane 129.

Figure 19:
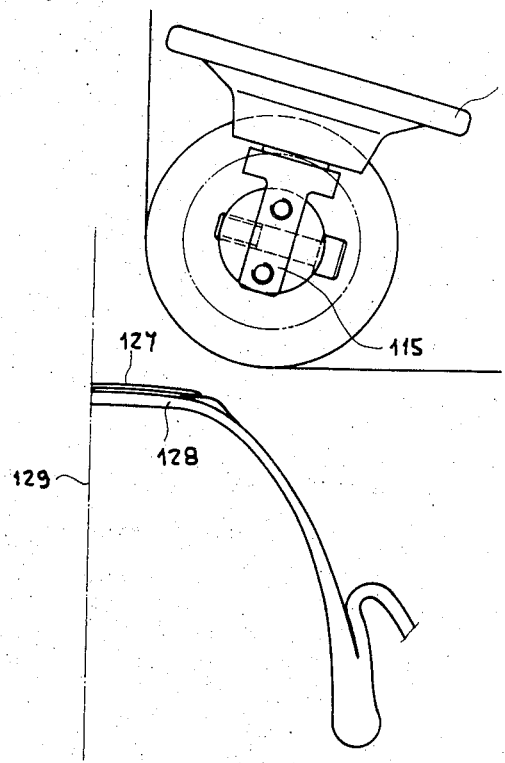
Figure 20:
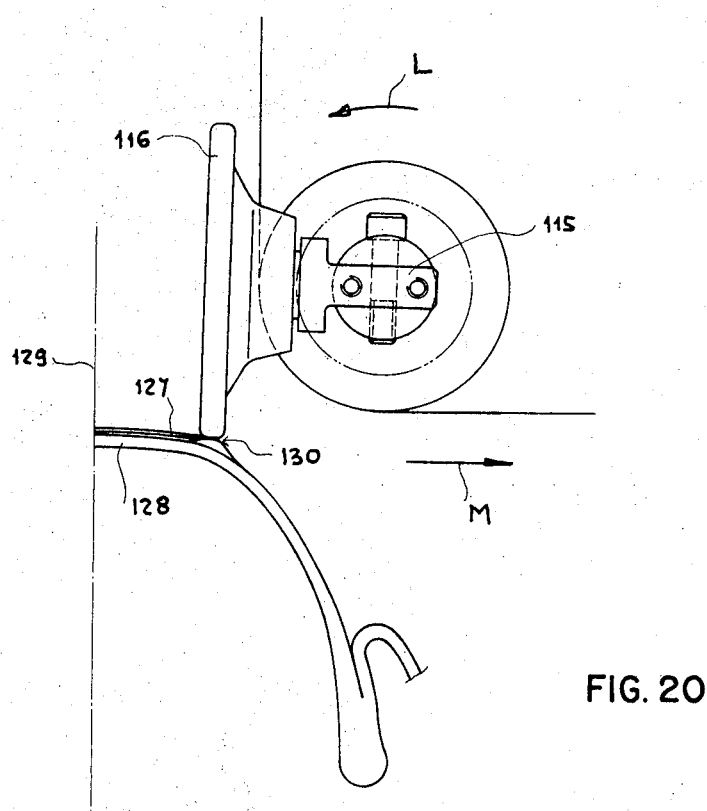

At the beginning of the operation, i.e., in rest condition, the stitching disc 116 mounted on carriage 87 (for example as illustrated in FIG. 10) is turned to the opposite side with respect to carcass 128. The axis of stem 115 supporting disc 116 is so arranged as to form a very small angle (10°–15° at the most) with the mid-circumferential plane 129 (FIG. 19). While carcass 128 is placed into rotation integrally with the expandable drum (not illustrated for the sake of simplicity), carriage 87, together with disc 116, is displaced in a direction perpendicular to the drum axis by the action of the motor-speed reducer 79, and in a direction parallel to the same axis by the action of the motor-speed reducer 94, until it is at a desired distance from the carcass. When the carriage has reached this position, the double-acting cylinder 107 is activated so that disc 116 is elastically pressed on breaker 127 after its axis has been rotated, together with the vertical shaft 100, starting from the rest position, in the direction of arrow L (FIG. 20). The position reached by carriage 87 is therefore such that, by means of said rotation, disc 116 is practically at the mid-circumferential plane 129, with which plane the axis of stem 115 forms an angle of 90°, complying with the already indicated condition. The stitching of breaker 127 on carcass 128 is carried by displacing disc 116, together with carriage 87, in a direction parallel to the drum axis and in the direction of arrow M by the action of the motor-speed reducer 94 (FIG. 20) until disc 116 is at position 130. Disc 116 is then returned to the rest condition by operating the double-acting cylinder 107 and the motor-speed reducers 79 and 94 in the direction opposite to the preceding one.

After the application of tread band 131 on the nonexpandable breaker 127 in a conventional manner, the stitching of the cylindrical portion of said tread band is carried out as done for breaker 127. However, when disc 116 has reached tread shoulder 132 (FIG. 21), the motor-speed reducer 79, in addition to the motor-speed reducer 94, comes into action.

Figure 21:
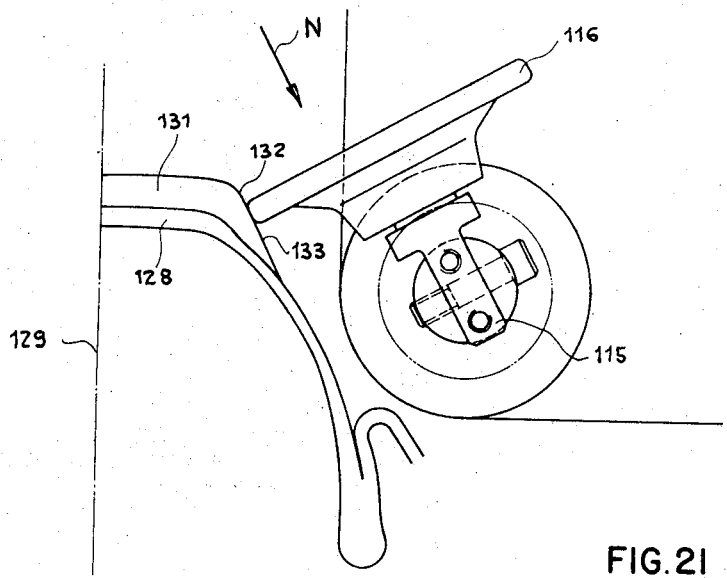

The speeds and the displacements imparted to disc 116 by the motor-speed reducers are again in this case adjusted and controlled by a numerical control programmer. In this way the stitching is effected perfectly, since the axis of stem 115 of disc 116 forms an angle of 90° with respect to the perpendicular of any point of buttress 133 of tread band 131. The stitching of said buttress 133 is therefore carried out by starting from the tread shoulder 132 in the direction of arrow N (FIG. 21). At the end of this operation, the axis of disc 116 is again brought to the rest position as indicated above.

If carcass 128 has been built up on a machine having a rigid drum and is already provided with side walls and strips of non-adhesive material (not illustrated), and if sidewall 134 is turned up on buttress 133 of tread band 131, for example, according to the method described in U.S. Pat. No. 3,409,491, the present apparatus is also able to carry out the stitching operation necessary to obtain the perfect adhesion of said sidewall on the shaped carcass and on the tread band. From its rest condition (shown in dotted lines in FIG. 22), disc 116 is displaced together with carriage 87 in a direction parallel to the drum axis by means of the motor-speed reducer 94 and is caused to approach said axis by means of the motor-speed reducer 79.

Figure 22:
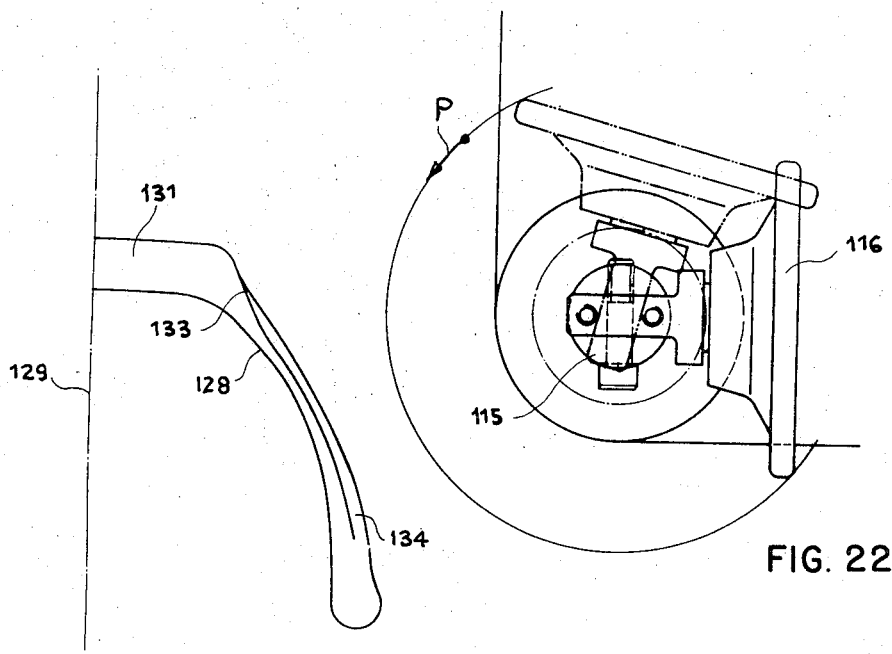

The double-acting cylinder 107 is operated so that the axis of disc 116 rotates in the direction of arrow P through an angle of over 270° (according to the stroke imparted to the double-acting cylinder 107) and is brought to its second rest position, in which the axis of stem 115 is parallel to the drum axis (FIG. 22). From this position, shown in dotted lines in FIG. 23, the motor-speed reducer 94 reverses its senses of motion as does the double-acting cylinder 107, which originates the rotation, in the direction of arrow R, of the axis of disc 116, which is elastically pressed on the edge of sidewall 134, in proximity of bead 135, the axis of stem 115 remaining at an angle of 90° with respect to the perpendicular to the shaped surface. Then the motor-speed reducer 79 is actuated simultaneously with the motor-speed reducer 94, the speeds and the displacements imparted from them to disc 116 being adjusted and controlled by the numerical control programmer in such a way that disc 116 moves from bead 135 towards tread band 131, maintaining the aforementioned geometrical condition at each point (FIG. 23). After this stitching operation, disc 116 is at first brought to its second rest position by rotating it, by means of the double-acting cylinder 107, in the direction of arrow P (FIG. 24). From this position, it is then brought to its first rest position, according to the above indicated procedures, being thereby detached from the already completely built up tire 136, which can be removed from the drum in any desired manner (FIG. 25).

Although two specific embodiments of the present invention have been described, it is understood that the scope of the invention includes any modification which one skilled in the art would make in view of the above indicated invention concepts.

What is claimed is:

1. An apparatus for stitching and eventually removing a tire carcass built up in a machine provided with a tire building drum, which comprises a horizontal base, two carriages movable along said base in a direction parallel to the longitudinal axis of the building drum by a first actuator means having reversible working sense, and in a direction perpendicular to said axis by a second actuator means having reversible working sense; two vertical columns, each of which is integral with only one of said carriages and supports at its other end one stitching disc, the axis of rotation of said disc lying in the horizontal plane containing the axis of rotation of said building drum; means for driving the axis of rotation of each stitching disc through a plurality of angularly spaced positions including two extreme positions angularly spaced apart at an angle greater than about 180° and smaller than about 360°; resilient means for resiliently rotating in said plane the axis of rotation of each stitching disc in the direction of either of said extreme positions; for each of said carriages, a single-acting cylinder which actuates a vertical shaft coaxial with the corresponding vertical column at a point near one end of said vertical shaft, said vertical shaft being fastened at the other end to a second stitching disc which is mounted in cantilevered fashion; and programmer control means for controlling the operations, the speeds and the working sense of said carriages and for controlling the operations and the working sense of said resilient means so that the apparatus operates according to a pre-established sequence.

2. An apparatus for stitching and eventually removing a tire carcass built up in a machine provided with a tire building drum, which comprises a horizontal base, two carriages movable along said base in a direction parallel to the longitudinal axis of the building drum by a first actuator means having reversible working sense and comprising motor-speed reducers, and in a direction perpendicular to said axis by a second actuator means having reversible working sense and comprising motor-speed reducers; two vertical columns, each of which is integral with only one of said carriages and supports at its other end one stitching disc, the axis of rotation of said disc lying in the horizontal plane containing the axis of rotation of said building drum; means for driving the axis of rotation of each stitching disc through a plurality of angularly spaced positions including two extreme positions angularly spaced apart at an angle greater than about 180° and smaller than about 360°; resilient means for resiliently rotating in said plane the axis of rotation of each stitching disc in the direction of either of said extreme positions, said resilient means comprising, for each of said carriages, a double-acting cylinder which actuates the corresponding vertical column, a further motor-speed reducer capable of angularly positioning each of said double-acting cylinders, said double-acting cylinders each with the corresponding vertical column being symmetrically arranged with respect to the center line of the building drum; for each of said carriages, a single-acting cylinder which actuates a vertical shaft coaxial with the corresponding vertical column at a point near one end of said vertical shaft, said vertical shaft being fastened at the other end to a second stitching disc which is mounted in cantilevered fashion; and programmer control means for controlling the operations, the speeds and the working sense of said carriages and for controlling the operations and working sense of said resilient means so that the apparatus operates according to a pre-established sequence.

3. The apparatus according to claim 1, wherein said motor-speed reducers are able to be operated at three pairs of equal speeds having opposite working sense.

4. The apparatus according to claim 1, wherein the double-acting cylinder is capable of selectively moving the vertical column between two extreme positions angularly spaced apart from each other by an angle in the range between 270° and 360°.

References Cited

UNITED STATES PATENTS

| | | | |
|---|---|---|---|
| 2,936,023 | 5/1960 | Giletta et al. | 156—410 |
| 3,125,481 | 3/1964 | Mallory et al. | 156—408 |
| 3,031,353 | 4/1962 | Mallory | 156—410 X |
| 1,872,830 | 8/1932 | Shook et al. | 156—409 |

FOREIGN PATENTS

| | | | |
|---|---|---|---|
| 531,285 | 10/1956 | Canada | 156—410 |
| 1,173,015 | 10/1958 | France | 156—410 |

CLIFTON B. COSBY, Primary Examiner

U.S. Cl. X.R.

156—132, 396, 410, 413, 421